March 28, 1944. P. O. PFEIFFER 2,345,068
VEHICLE TIRE
Original Filed Aug. 29, 1940

INVENTOR
Paul O. Pfeiffer
BY
Evans + McCoy
ATTORNEYS

Patented Mar. 28, 1944

2,345,068

UNITED STATES PATENT OFFICE 2,345,068

VEHICLE TIRE

Paul O. Pfeiffer, Akron, Ohio, assignor to General Tire & Rubber Company, Akron, Ohio, a corporation of Ohio Original application August 29, 1940, Serial No. 354,640. Divided and this application August 22, 1941, Serial No. 407,873

11 Claims. (Cl. 152—165)

This invention relates to vehicle tires, and more particularly to a tire capable of operation either as a pneumatic tire or as a cushion tire, the present application being a division of my copending application, Serial No. 354,640, filed August 29, 1940, upon which Patent No. 2,273,283 was granted February 17, 1942.

Pneumatic tires used on wheels of airplanes or motor vehicles in military service are subject to the danger of puncture by bullets. The puncture of an airplane landing wheel tire is apt to cause damage to the plane in landing and the puncture of a ground vehicle tire puts the vehicle out of commission. The use of solid rubber or cushion tires is objectionable in planes because of the increased weight and inferior cushioning ability of the tire. The use of cushion tires on motor vehicles is objectionable because of the inferior cushioning ability of the tire, the greater difficulty in steering, and because of the fact that cushion tires are much less durable than pneumatic tires.

The present invention has for its object to provide a pneumatic tire which is so constructed that it is capable of sustaining the loads to which it may be subjected without the aid of internal air pressure, and which is capable of operating satisfactorily after its air has been released by puncture.

With the above and other objects in view the invention may be said to comprise a tire, as illustrated in the accompanying drawing hereinafter described and particularly set forth in the appended claims, together with such variations and modifications thereof as will be apparent to one skilled in the art to which the invention appertains. Reference should be had to the accompanying drawing forming a part of the specification, in which:

Figure 1:
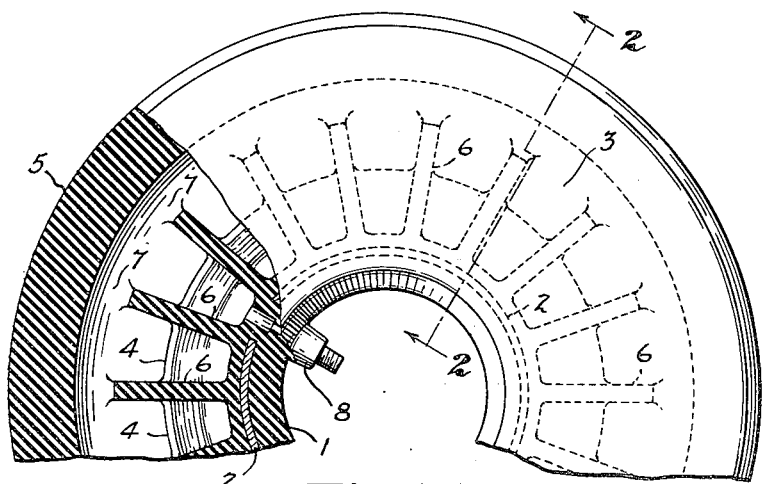
Figure 1 is a fragmentary side elevation of a tire embodying the present invention, a portion of the tire wall being broken away to show the interior structure.

The tire of the present invention is a circumferential continuous one-piece rubber tire having a tire base 1 reinforced with a cylindrical metal band 2, side walls 3 stiffened by internal circumferential ribs 4 and a thickened tread 5. A series of closely spaced transverse webs 6 are provided within the tire cavity. These webs are integral with the base and side walls of the tire and extend from the base of the tire to adjacent the tread thereof. The upper edges of the webs 6 are spaced from the tread of the tire to provide apertures 7, so that all of the chambers between the webs 6 are in communication for equalization of air pressure within the tire. The tire is provided with a valve stem 8 through which air under pressure may be introduced to the interior of the tire. The webs 6, which are composed of elastic rubber, support load under tension when weight is imposed upon the tire. The weight imposed upon the tire tends to bulge the side walls of the tire, increasing the width of the cavity and stretching the transverse webs 6. The tire is designed to operate normally with a low inflation pressure, the load being sustained partially by the body of compressed air within the tire cavity and partially by the tension webs 6. When the air within the tire is released by puncture, the load is supported mainly by the transverse tension webs, which are capable of giving service for a considerable period of time after puncture of the tire.

Figure 2:
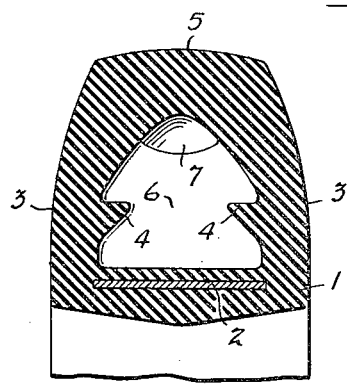
Fig. 2 is a transverse section taken on the line indicated at 2—2 in Fig. 1.
Figure 3:
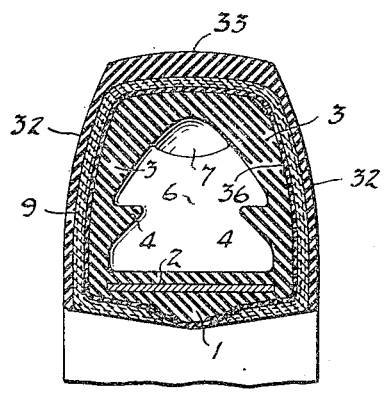
Fig. 3 is a transverse section through a tire like that shown in Figs. 1 and 2 except that a fabric reinforcement is provided.

The tire of the present invention may be composed entirely of rubber, as shown in Fig. 2, or may be reinforced with cord fabric, as shown in Fig. 3 of the drawing, the tire shown in Fig. 3 being the same in structure as that shown in Fig. 2 except that the tire walls are reinforced with a plurality of plies 9 of cord fabric. The plies of cord fabric have their opposite edges attached to the underside of the tire base and extend from one side of the tire base to the other through the side walls and tread portion of the tire.

Figure 4:
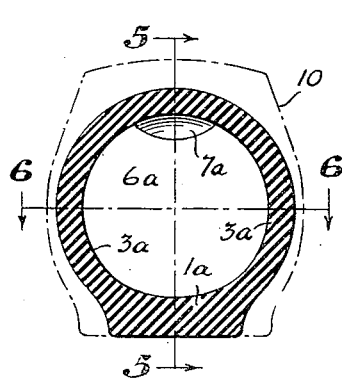
Fig. 4 is a sectional view showing an inner tube embodying the invention.
Figure 5:
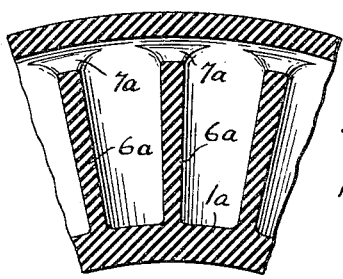
Fig. 5 is a section taken on the line indicated at 5—5 in Fig. 4.
Figure 6:
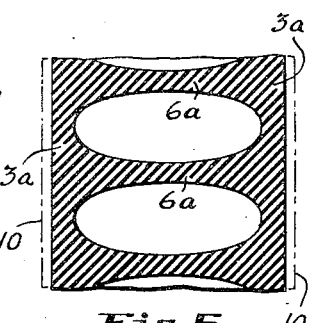
Fig. 6 is a section taken on the line indicated at 6—6 in Fig. 4.

The tire of the present invention may also be used as an inner tube for a conventional pneumatic tire casing, as shown in Fig. 4 of the drawing. In this instance a tire or tube embodying the invention is molded and vulcanized to an external form to fit within a conventional tire casing 10, the tire or tube having a base portion 1a adapted to fit between the beads of the tire casing 10 and engage the rim upon which the tire is mounted. The tube also has flexible side walls 3a and flexible transverse webs 6a. When the tire or tube of the present invention is employed as an inner tube for a tire casing, the metal reinforcing band 2 may be omitted and also the internal reinforcing ribs 4. The transverse webs 6a, however, serve the same purpose as in the forms previously described, the upper edges of the webs 6a being spaced from the tread portion to provide apertures 7a for equalization of air pressure. The webs 6a are preferably formed so that they have gradually increasing thickness from their inner to their outer edges, as shown in Fig. 5 of the drawing, and these webs also are preferably formed of gradually decreasing thickness from their side edges to the center plane of the tire, as shown in Fig. 6. The thickening of the side edge portions of the webs serves to stiffen the side walls and the tapering of the webs from their outer edges to the tire base provides greater resistance to elongation in the portions of the webs adjacent the tread, so that the load is more advantageously distributed throughout the webs.

The tire of the present invention is preferably made by the method described and claimed in my Patent No. 2,273,283, granted February 17, 1942.

It is to be understood that variations and modifications of the specific devices herein shown and described for purposes of illustration may be made without departing from the spirit of the invention.

What I claim is:

1. A rubber tire in the form of a circumferentially continuous unspliced tube which has a relatively stiff interior base wall, a thickened exterior tread wall and flexible side walls, a valve stem attached to the tire through which air may be introduced into the tire to inflate the same, and a series of load supporting tension members within the tire cavity, each in the form of a flexible elastic rubber web extending transversely across the tire cavity and spaced inwardly from the tread wall, each web being disposed in a plane intersecting the tread and base of the tire and having opposite edge portions integrally joined to the opposite side walls of the tire.

2. A rubber tire in the form of a circumferentially continuous unspliced tube which has a relatively stiff interior base wall, a thickened exterior tread wall and flexible side walls, a valve stem attached to the tire through which air may be introduced into the tire to inflate the same, and a series of load supporting tension members within the tire cavity, each in the form of an elastic rubber web extending transversely across the tire cavity, each web having its inner edge integrally joined to the base wall, its outer edge unattached and its side edges integrally joined to the side walls of the tire.

3. A rubber tire in the form of a circumferentially continuous unspliced tube which has a relatively stiff interior base wall, a thickened exterior tread wall and flexible side walls, and a series of load supporting tension members within the tire cavity, each in the form of an elastic rubber web extending transversely across the tire cavity, each web having its inner edge integrally joined to the base wall and its side edges integrally joined to the side walls of the tire, each web extending from the tire base to adjacent the tire tread and having an outer edge portion spaced from the tread to permit passage of air.

4. A rubber tire in the form of a circumferentially continuous unspliced tube which has a relatively stiff interior base wall, a thickened exterior tread wall and flexible side walls, a valve stem attached to the tire through which air may be introduced into the tire to inflate the same, an inextensible reinforcing band embedded in the tire base, and a series of load supporting tension members within the tire cavity in the form of a series of circumferentially spaced flexible elastic rubber webs spaced inwardly from the tread wall and extending transversely across the tire cavity, each disposed in a plane intersecting the tread and base and having opposite edge portions integrally joined to the opposite side walls of the tire.

5. A rubber tire in the form of a circumferentially continuous unspliced tube which has an interior base wall, a thickened exterior tread wall and flexible side walls, a valve stem attached to the tire through which air may be introduced into the tire to inflate the same, an endless metal band embedded in the tire base, and a series of load supporting tension members within the tire cavity in the form of a series of circumferentially disposed flexible elastic rubber webs spaced inwardly from the tread wall and extending transversely across the tire cavity, each disposed in a plane intersecting the tread and base and having opposite edge portions integrally joined to the opposite side walls of the tire.

6. A rubber tire in the form of a circumferentially continuous unspliced tube which has a relatively stiff interior base wall, a thickened exterior tread wall and flexible side walls, and a series of load supporting tension members uniformly spaced throughout the circumference of the tire, each in the form of an elastic rubber web extending transversely across the tire cavity, each web having its inner edge integrally joined to the tire base, its outer edge unattached and its side edges integrally joined to the side walls of the tire.

7. A rubber tire of relatively large cross section and relatively small base diameter in the form of a circumferentially continuous unspliced tube which has a relatively stiff interior base wall, a thickened exterior tread wall and flexible side walls, and a series of load supporting tension members within the tire cavity, each in the form of an elastic rubber web extending transversely across the tire cavity, each web having its inner edge integrally joined to the tire base and its side edges integrally joined to the side walls of the tire, each web extending from the tire base to adjacent the tire tread and having an outer edge portion spaced from the tread to permit passage of air.

8. A rubber tire in the form of a circumferentially continuous unspliced tube which has a relatively stiff interior base wall, a thickened exterior tread wall and flexible side walls, cord fabric embedded in the side walls and tread portion of the tire and extending from one side edge of the base to the opposite side edge, a valve stem attached to the tire through which air under pressure may be introduced into the tire cavity, and a series of circumferentially spaced load supporting tension members within the tire cavity, each in the form of a flexible and elastic web of rubber disposed in a plane intersecting the tread and base portions of the tire and having its outer edge spaced from the tread wall and its opposite side edges integrally joined to the side walls of the tire.

9. A rubber tire in the form of a circumferentially continuous unspliced tube which has a relatively stiff interior base wall, a thickened exterior tread wall and flexible side walls, cord fabric embedded in the side walls and tread portion of the tire and extending from one side edge of the base to the opposite side edge, a valve stem attached to the tire through which air under pressure may be introduced into the tire cavity, and a series of circumferentially spaced load supporting tension members within the tire cavity, each in the form of a flexible and elastic web of rubber, having its inner edge integrally joined to the tire base and its side edges integrally joined to the side wall of the tire, each web extending from the base of the tire to adjacent the tread portion and having an outer edge portion spaced from the tread to permit passage of air.

10. A rubber tire in the form of a circumferentially continuous unspliced tube which has a relatively stiff interior base wall, a thickened exterior tread wall and flexible side walls, continuous circumferential ribs upon the interior of said side walls, and a series of load supporting tension members within the cavity, each in the form of a flexible and elastic web of rubber disposed substantially in a radial plane and extending transversely across the cavity, each web having an unattached outer edge and its opposite side edges integrally joined to the side walls and to said circumferential ribs.

11. A rubber tire in the form of a circumferentially continuous unspliced tube which has a relatively stiff interior base wall, a thickened exterior tread wall and flexible side walls, each side wall having a continuous interior rib spaced outwardly from the base and inwardly from the tread, and a series of load supporting tension members within the cavity, each extending from the base to adjacent the tread of the tire and having its outer edge unattached and edge portions integrally joined to the base and to the side walls and ribs.

PAUL O. PFEIFFER.